(12) United States Patent
Liu et al.

(10) Patent No.: US 9,938,957 B2
(45) Date of Patent: Apr. 10, 2018

(54) ROTOR

(71) Applicant: TERAL INC., Fukuyama-shi, Hiroshima (JP)

(72) Inventors: Hao Liu, Narashino (JP); Takeo Fujii, Fukuyama (JP)

(73) Assignee: TERAL INC., Fukuyama-shi (JP)

( * ) Notice: Subject to any disclaimer, the term of this patent is extended or adjusted under 35 U.S.C. 154(b) by 212 days.

(21) Appl. No.: 14/416,354

(22) PCT Filed: May 28, 2014

(86) PCT No.: PCT/JP2014/002824
§ 371 (c)(1),
(2) Date: Jan. 22, 2015

(87) PCT Pub. No.: WO2014/192297
PCT Pub. Date: Dec. 4, 2014

(65) Prior Publication Data
US 2015/0285217 A1 Oct. 8, 2015

(30) Foreign Application Priority Data
May 28, 2013 (JP) ................................. 2013-112137

(51) Int. Cl.
F03D 1/06 (2006.01)
F03B 13/26 (2006.01)
F03B 17/06 (2006.01)

(52) U.S. Cl.
CPC .......... *F03D 1/0633* (2013.01); *F03B 13/264* (2013.01); *F03B 17/061* (2013.01);
(Continued)

(58) Field of Classification Search
CPC .... F03D 1/0608; F03D 1/0633; F03D 1/0641; F03D 1/0675; F03D 1/0683; F03B 3/121;
(Continued)

(56) References Cited

U.S. PATENT DOCUMENTS 3,065,933 A * 11/1962 Williams ............... B64C 27/467
244/17.11
5,992,793 A * 11/1999 Perry .................... B64C 27/463
244/17.11

(Continued)

FOREIGN PATENT DOCUMENTS

CN 1732340 A 2/2006
CN 101619708 A 1/2010
(Continued)

OTHER PUBLICATIONS

Aug. 19, 2014 International Search Report issued in International Application No. PCT/JP2014/002824.
(Continued)

*Primary Examiner* — Jason Shanske
*Assistant Examiner* — Alexander White
(74) *Attorney, Agent, or Firm* — Oliff PLC

(57) ABSTRACT

A rotor for a wind/water power machine that can reduce fluid resistance. A rotor provided with a hub and blades. A projected plane perpendicular to a rotational center axis line of the rotor, front edges of the blades protrude, in at least one part, forward in the rotational direction of the rotor relative to a first line segment; front edge protruding tips thereof are disposed in positions separated outward in the radial direction of the rotor from the outer peripheral edge of the hub by a length 0.4 to 0.6 times the length of the blade; and portions of the front edges of the blades that extend from the ends on the inside in the radial direction of the rotor to the front edge protruding tips are curved or bent convexly, in at least one part, rearward in the rotational direction of the rotor relative to a second line segment.

5 Claims, 6 Drawing Sheets

(52) U.S. Cl.
CPC ....... *F05B 2210/16* (2013.01); *F05B 2240/30* (2013.01); *F05B 2250/61* (2013.01); *F05B 2250/71* (2013.01); *Y02E 10/223* (2013.01); *Y02E 10/28* (2013.01); *Y02E 10/721* (2013.01)

(58) Field of Classification Search
CPC ...... F03B 3/126; F03B 13/264; F03B 17/061; F05B 2210/16; F05B 2240/30; F05B 2240/301; F05B 2240/302; F05B 2250/61; F05B 2250/71; F05B 2250/711; F05B 2250/712; F05B 2250/713
See application file for complete search history.

(56) References Cited

U.S. PATENT DOCUMENTS

| | | | | |
|---|---|---|---|---|
| 8,182,231 | B2* | 5/2012 | Corten | F03D 1/0641 416/223 R |
| 8,535,008 | B2* | 9/2013 | Dewar | F03B 3/12 416/170 R |
| 2008/0273981 | A1 | 11/2008 | Ito et al. | |
| 2009/0068019 | A1 | 3/2009 | Wobben | |
| 2009/0074585 | A1 | 3/2009 | Koegler et al. | |
| 2009/0226324 | A1* | 9/2009 | Garcillan Rueda | F03D 1/0641 416/223 R |
| 2009/0324416 | A1* | 12/2009 | Bonnet | F03D 1/0633 416/223 R |
| 2010/0316500 | A1* | 12/2010 | Blanton | F03D 1/0641 416/223 R |
| 2011/0142628 | A1 | 6/2011 | Xiong | |
| 2015/0285217 | A1 | 10/2015 | Liu et al. | |

FOREIGN PATENT DOCUMENTS

| | | |
|---|---|---|
| CN | 201461226 U | 5/2010 |
| CN | 102003333 A | 4/2011 |
| DE | 19963252 A1 | 7/2001 |
| EP | 2141355 A2 | 1/2010 |
| JP | 2006-132542 A | 5/2006 |
| JP | 2006-521483 A | 9/2006 |
| WO | 2006/106734 A1 | 10/2006 |
| WO | 2009/098340 A1 | 8/2009 |
| WO | 2012/134044 A1 | 10/2012 |
| WO | 2014/192297 A1 | 12/2014 |

OTHER PUBLICATIONS

Apr. 21, 2016 Office Action issued in Canadian Patent Application No. 2,880,177.
Apr. 27, 2017 Office Action issued in Canadian Patent Application No. 2934764.
Jan. 20, 2017 Extended Search Report issued in European Patent Application No. 14803812.8.
Dec. 20, 2016 Office Action issued in Chinese Patent Application No. 201480001928.X.
Oct. 23, 2017 Office Action issued in Canadian Patent Application No. 2,934,764.
Jul. 3, 2017 Office Action issued in Chinese Patent Application No. 201480001928.X.

* cited by examiner

ROTOR

TECHNICAL FIELD

The present invention relates to a rotor for a wind or water power machine, the rotor including a hub, supported by a main shaft, and a blade, a root end of the blade being connected to the hub.

BACKGROUND ART

In a conventional example of a rotor for a wind power generator, the leading edge of the blade is formed to be linear across nearly the entire length of the leading edge (for example, Patent Literature 1).

CITATION LIST

Patent Literature

PTL 1: JP 2006-132542 A

SUMMARY OF INVENTION

Technical Problem

In general, when the rotor for a wind power generator rotates, a vortex is generated near the leading edge of the blade due to the flow of wind (air), i.e. fluid, near the surface of the blade and to centrifugal force. This vortex flows across the leading edge of the blade outward in the radial direction of the rotor from near the end of the leading edge that is inward in the radial direction of the rotor. In the rotor disclosed in Patent Literature 1, such a vortex flows across the leading edge of the blade outward in the radial direction of the rotor from near the end of the leading edge that is inward in the radial direction of the rotor, yet the vortex sometimes separates from the surface of the blade and disintegrates just before reaching near the end that is outward in the radial direction of the rotor. Fluid resistance increases due to such disintegration of the vortex, causing the problems of increased noise and a reduction in power generation efficiency.

The present invention has been conceived to resolve these problems and provides a rotor for a wind or water power machine, the rotor reducing the fluid resistance experienced by the blade.

Solution to Problem

The main structure of the present invention for resolving these problems is as follows.

A rotor according to the present invention is for a wind or water power machine, the rotor comprising a hub, supported by a main shaft, and a blade, a root end of the blade being connected to the hub, wherein in a projection plane perpendicular to a central axis of rotation of the rotor, at least a portion of a leading edge of the blade protrudes forward in a rotational direction of the rotor with respect to a first line segment connecting an inward end of the leading edge in a radial direction of the rotor and an outward end of the leading edge in the radial direction of the rotor, and a tip of a leading edge protrusion is positioned outward in the radial direction of the rotor from a peripheral edge of the hub by a distance of 0.4 to 0.6 times a length of the blade, and at least a portion of a section of the leading edge of the blade extending from the inward end of the leading edge in the radial direction of the rotor to the tip of the leading edge protrusion is curved or bent to be convex backward in the rotational direction of the rotor with respect to a second line segment connecting the inward end of the leading edge in the radial direction of the rotor and the tip of the leading edge protrusion.

According to the rotor of the present invention, when the rotor rotates, the vortex generated near the leading edge of the blade is generated along the leading edge across the entire length thereof, and near the tip of the leading edge protrusion, the vortex can be split in two parts that act to cancel each other out. As a result, the vortex that is generated near the leading edge can be weakened, and the fluid resistance experienced by the blade can be reduced.

In the present invention, a "wind or water power machine" refers to any machine that uses the motive power obtained by fluid force, e.g. wind power, water power, or the like, such as a wind power generator (including a wave power generator that uses air flow and the like; the same holds below), a water power generator (including a tidal power generator, an ocean current power generator, and the like; the same holds below), or the like.

The "length of the blade" in the present invention refers to the radius of the rotor minus the radius of the hub. The "radius of the rotor" refers to the distance from the central axis of rotation of the rotor to the outermost edge of the blade in the radial direction of the rotor. When the hub does not have a circular shape in a projection plane perpendicular to the central axis of rotation of the rotor, the "radius of the hub" refers to the radius of a circumscribed circle of the hub in the projection plane.

In the projection plane, the "tip of the leading edge protrusion" in the present invention refers to a point, among points on the leading edge of the blade that are located forward in the rotational direction of the rotor with respect to the first line segment, yielding the maximum distance between the point and the intersection of the first line segment with a perpendicular from the point to the first line segment.

Furthermore, "curved or bent" in the present invention refers to extending in a shape in which one or more arcs and/or lines are connected.

In the rotor according to the present invention, in a projection plane perpendicular to a central axis of rotation of the rotor, at least a portion of a trailing edge of the blade preferably protrudes forward in the rotational direction of the rotor with respect to a third line segment connecting an inward end of the trailing edge in the radial direction of the rotor and an outward end of the trailing edge in the radial direction of the rotor, and a tip of a trailing edge protrusion is preferably positioned outward in the radial direction of the rotor from the peripheral edge of the hub by a distance of 0.4 to 0.6 times the length of the blade, and at least a portion of a section of the trailing edge of the blade extending from the inward end of the trailing edge in the radial direction of the rotor to the tip of the trailing edge protrusion is preferably curved or bent to be convex backward in the rotational direction of the rotor with respect to a fourth line segment connecting the inward end of the trailing edge in the radial direction of the rotor and the tip of the trailing edge protrusion.

According to this structure, the shape of the trailing edge of the blade can be formed to follow the shape of the leading edge, thereby preventing the friction drag on the surface of the blade from becoming excessively large in at least a portion at the width center line of the blade.

In the projection plane, the "tip of the trailing edge protrusion" in the present invention refers to a point, among points on the trailing edge of the blade that are located forward in the rotational direction of the rotor with respect to the third line segment, yielding the maximum distance between the point and the intersection of the third line segment with a perpendicular from the point to the third line segment.

In the rotor according to the present invention, in a projection plane perpendicular to a central axis of rotation of the rotor, at least a portion of a section of the leading edge of the blade extending from the tip of the leading edge protrusion to the outward end of the leading edge in the radial direction of the rotor preferably protrudes forward in the rotational direction of the rotor with respect to a fifth line segment connecting the tip of the leading edge protrusion and the outward end of the leading edge in the radial direction of the rotor.

This structure can reduce the air resistance further.

Another rotor according to the present invention is a rotor for a wind or water power machine comprising a hub, supported by a main shaft, and a blade, a root end of the blade being connected to the hub, wherein in a projection plane perpendicular to a central axis of rotation of the rotor, at least a portion of a leading edge of the blade protrudes forward in a rotational direction of the rotor with respect to a first line segment connecting an inward end of the leading edge in a radial direction of the rotor and an outward end of the leading edge in the radial direction of the rotor, at least a portion of a section of the leading edge of the blade extending from the inward end of the leading edge in the radial direction of the rotor to a tip of a leading edge protrusion is curved or bent to be convex forward in the rotational direction of the rotor with respect to a second line segment connecting the inward end of the leading edge in the radial direction of the rotor and the tip of the leading edge protrusion, and at least a portion of a section of the leading edge of the blade extending from the tip of the leading edge protrusion to the outward end of the leading edge in the radial direction of the rotor protrudes backward in the rotational direction of the rotor with respect to a fifth line segment connecting the tip of the leading edge protrusion and the outward end of the leading edge in the radial direction of the rotor.

According to the rotor of the present invention, the fluid resistance experienced by the blade can be reduced.

In the other rotor according to the present invention, in a projection plane perpendicular to a central axis of rotation of the rotor, at least a portion of a trailing edge of the blade preferably protrudes forward in the rotational direction of the rotor with respect to a third line segment connecting an inward end of the trailing edge in the radial direction of the rotor and an outward end of the trailing edge in the radial direction of the rotor.

According to this structure, the shape of the trailing edge of the blade can be formed to follow the shape of the leading edge, thereby preventing the friction drag on the surface of the blade from becoming excessively large in at least a portion at the width center line of the blade.

In the rotor or the other rotor according to the present invention, in a projection plane perpendicular to a central axis of rotation of the rotor, a tip portion of the blade outward in the radial direction of the rotor preferably comprises a plurality of branched portions, each of the branched portions preferably tapers off outward in the radial direction of the rotor, and a portion of the leading edge and a portion of a trailing edge of the blade along the branched portions preferably extend along respective tangent lines to the leading edge and the trailing edge at branch starting positions of the branched portions.

According to this structure, in usage conditions such that laminar flow occurs, the vortex generated near the tip portion of the blade when the rotor rotates can be weakened, thereby further reducing the fluid resistance.

In the rotor or the other rotor according to the present invention, in a projection plane perpendicular to a central axis of rotation of the rotor, a plurality of extended portions is preferably provided along the leading edge, the extended portions extending forward in the rotational direction of the rotor from the leading edge of the blade and tapering off forward in the rotational direction of the rotor, and a tip portion of the blade outward in the radial direction of the rotor preferably tapers off outward in the radial direction of the rotor.

According to this structure, mainly in usage conditions such that turbulent flow occurs, the occurrence of turbulent flow near the leading edge of the blade can be suppressed, and the generation of a vortex near the tip portion of the blade can also be suppressed. Therefore, in the above case, the fluid resistance can be reduced further.

In the rotor or the other rotor according to the present invention, a plurality of projections each having a height and diameter of 5 mm or less is preferably formed in a region at least on a leading edge side of a surface of the blade at a front side of the rotor.

According to this structure, turbulent flow occurring mainly near the region on the leading edge side of the surface of the blade at the front side of the rotor can be weakened, and the fluid resistance experienced by the blade can be further reduced.

The "diameter" of the projections in the present invention refers to the diameter of a circumscribed circle of each projection in a projection plane perpendicular to the central axis of rotation of the rotor.

In the rotor or the other rotor according to the present invention, the number of the projections per unit area on the surface of the blade at least at the front side of the rotor preferably decreases from the leading edge towards the trailing edge of the blade.

According to this structure, while weakening the turbulent flow occurring mainly near the region on the leading edge side of the surface of the blade at the front side of the rotor, if the turbulent flow also occurs near or advances to another surface region of the blade, such turbulent flow can be weakened, thereby further reducing the fluid resistance experienced by the blade.

In the present invention, stating that the number of the projections per unit area on the surface of the blade "decreases" from the leading edge towards the trailing edge of the blade refers to the number of the projections per unit area on the surface of the blade decreasing with one or more locations as borders or decreasing gradually from the leading edge towards the trailing edge of the blade.

Advantageous Effect of Invention

According to the present invention, it is possible to provide a rotor for a wind or water power machine that can reduce the fluid resistance experienced by the blade.

BRIEF DESCRIPTION OF DRAWINGS

The present invention will be further described below with reference to the accompanying drawings, wherein.

DESCRIPTION OF EMBODIMENTS

The following describes embodiments of the present invention in detail with reference to the drawings.

Embodiment 1 of Rotor According to the Present Invention

Figure 1:
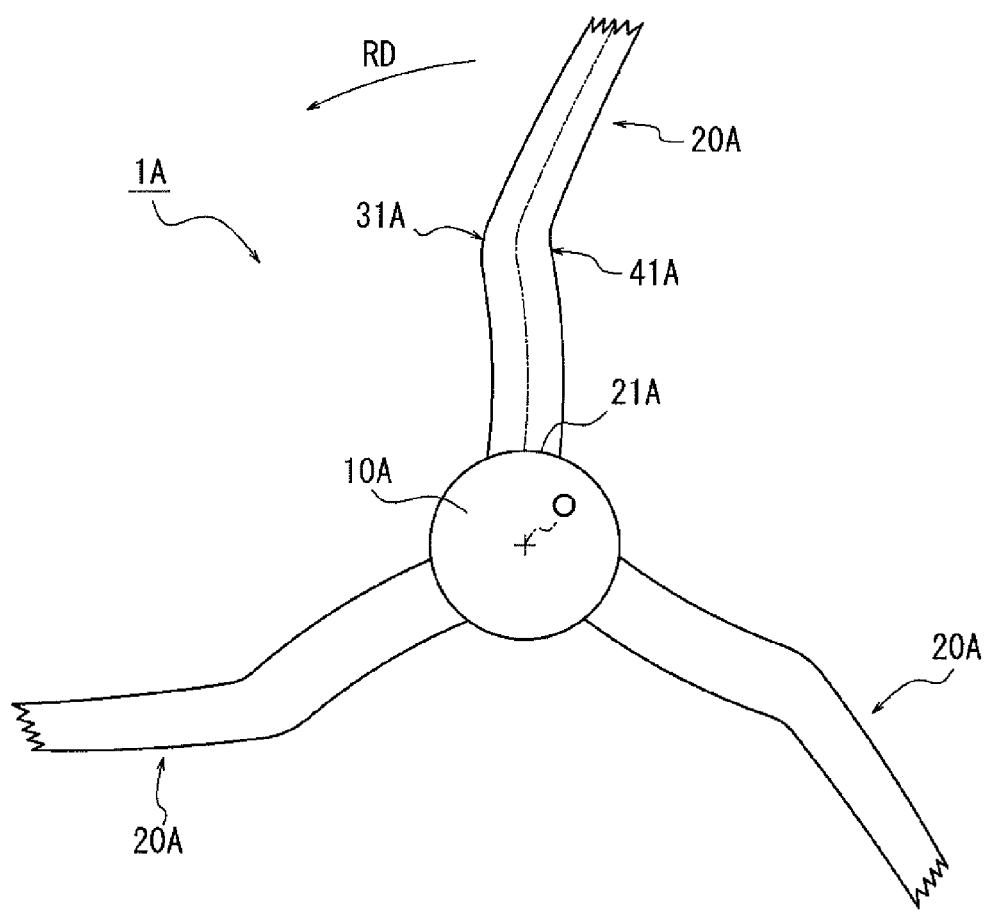
FIG. 1 is a front view illustrating Embodiment 1 of a rotor according to the present invention.
Figure 2:
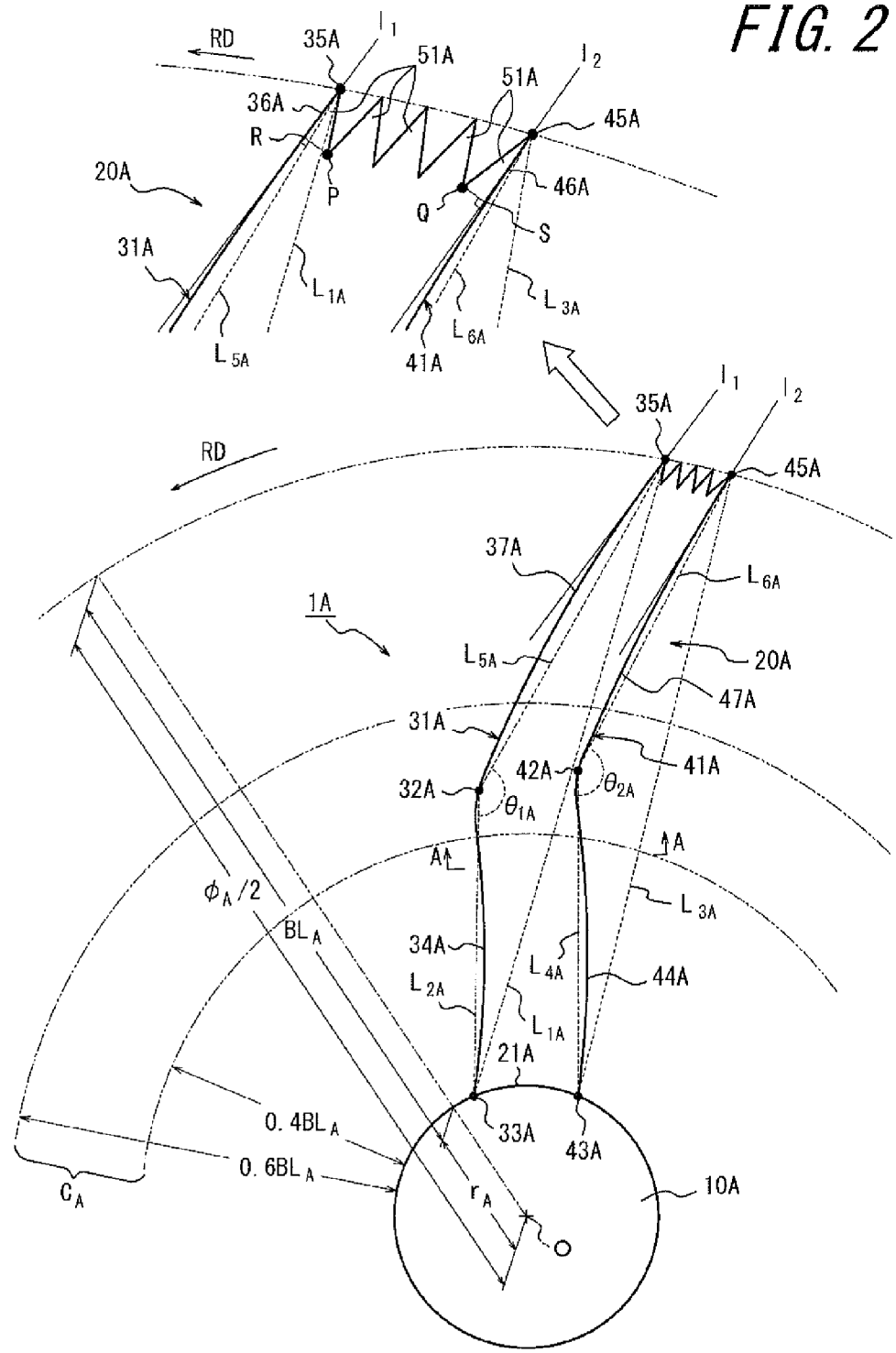
FIG. 2 is a front view illustrating the main parts of the rotor in FIG. 1.

Embodiment 1 of the present invention is described with reference to FIGS. 1 to 3. FIG. 1 is a front view illustrating Embodiment 1 of a rotor according to the present invention. FIG. 2 is a front view illustrating the main parts of the rotor 1A in FIG. 1. The rotor 1A in FIG. 1 is used in a wind power generator. The diameter $\varphi_A$ of the rotor 1A is 2 m, the number of revolutions at a wind speed of 5 m/s to 20 m/s is 10 rpm to 50 rpm, and the output is 1 kW to 2 kW. It is assumed that the rotor 1A is used in a laminar flow region with a Reynolds number of 100,000 or less. The rotor 1A according to the present embodiment, however, can be used not only in a wind power generator but also in a water power generator or another wind or water power machine. The diameter $\varphi_A$ of the rotor 1A is preferably 5 m or less, more preferably 0.2 m or more, and even more preferably 0.5 m or more.

The rotor 1A includes a hub 10A, supported by a main shaft (not illustrated), and three blades 20A, a root end 21A of each blade 20A being connected to the hub 10A. When looking at FIG. 1, the non-illustrated main shaft extends backwards from the back side of the hub 10A and is provided horizontally in this example. The hub 10A is supported by the main shaft so that the main shaft and the central axis of rotation O of the rotor 1A are aligned.

The number of blades 20A is not limited to three and may be any number.

Figure 3:
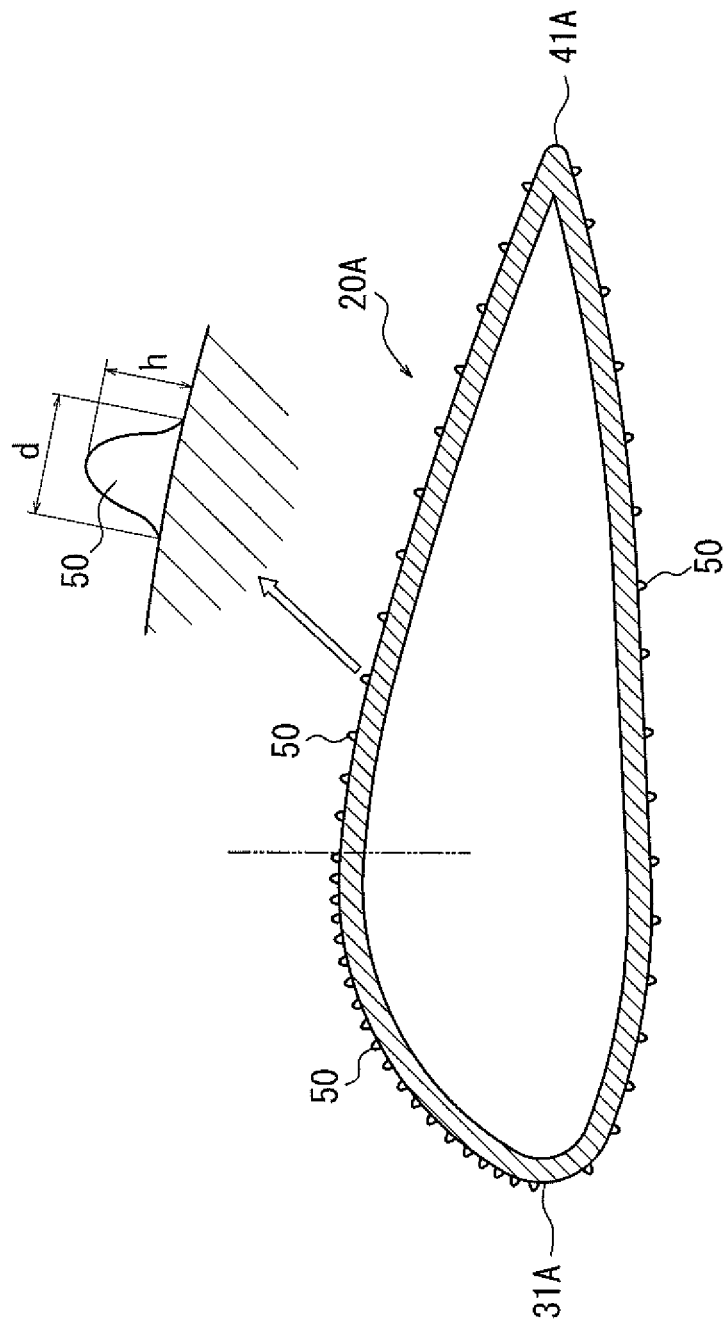
FIG. 3 is a cross-section along the A-A line in the width direction of the blade in FIG. 2.

The blade illustrated in FIGS. 2 and 3 is used for each blade 20A of the rotor 1A, yet it is also possible to use the blade illustrated in FIGS. 2 and 3 for only a portion of the blades 20A.

In the example in FIG. 2, in a projection plane perpendicular to the central axis of rotation O of the rotor 1A (i.e. in the plane of FIG. 2), the leading edge 31A of the blade 20A protrudes forward in the rotational direction RD (counterclockwise in FIG. 2) of the rotor 1A across the entire length of the leading edge 31A with respect to a first line segment $L_{1A}$, connecting an inward end 33A of the leading edge 31A in the radial direction of the rotor 1A and an outward end 35A of the leading edge 31A in the radial direction of the rotor 1A. While not illustrated, in the projection plane, the leading edge 31A of the blade 20A may alternatively protrude forward in the rotational direction RD of the rotor 1A with respect to the first line segment $L_{1A}$ across only a portion of the leading edge 31A.

In the projection plane perpendicular to the central axis of rotation O of the rotor 1A, in the example in FIG. 2, the tip 32A of the leading edge protrusion, with respect to the first line segment $L_{1A}$, in the leading edge 31A of the blade 20A is positioned outward in the radial direction of the rotor 1A from the peripheral edge of the hub 10A by a distance of 0.4 to 0.6 times the length $BL_A$ of the blade 20A. In other words, as illustrated in FIG. 2, the tip 32A of the leading edge protrusion is positioned within a radial direction region $C_A$ of the rotor 1A that is 0.4 to 0.6 times the length $BL_A$ of the blade 20A from the peripheral edge of the hub 10A. In this case, as described above, the length $BL_A$ of the blade 20A refers to the radius of the rotor 1A ($\varphi_A/2$) minus the radius $r_A$ of the hub 10A. The radius of the rotor 1A ($\varphi_A/2$) refers to the distance from the central axis of rotation O of the hub 10A to the outermost edge of the blade 20A in the radial direction of the rotor 1A. In the present example, the tip 32A of the leading edge protrusion is preferably positioned outward in the radial direction of the rotor 1A from the peripheral edge of the hub 10A by a distance of 0.47 to 0.57 times the length $BL_A$ of the blade 20A and more preferably by a distance of 0.51 to 0.53 times the length $BL_A$ of the blade 20A.

According to this structure of the leading edge 31A, when the rotor 1A rotates and a vortex is generated near the leading edge 31A of the blade 20A, disintegration of the vortex near the outward end of the blade 20A in the radial direction of the rotor 1A can be suppressed, and the vortex can be generated along the leading edge 31A across the entire length of the leading edge 31A. The vortex generated along the leading edge 31A of the blade 20A is split in two parts near the tip 32A of the leading edge protrusion. Therefore, the vortex that is further inward in the radial direction of the rotor 1A than the tip 32A of the leading edge protrusion and the vortex that is further outward in the radial direction of the rotor 1A than the tip 32A of the leading edge protrusion act to cancel each other out. As a result, the vortex that is generated near the leading edge 31A can be weakened, and the air resistance experienced by the blade 20A can be reduced.

From the perspective of weakening the above-described vortex generated near the leading edge 31A, the angle $\theta_{1A}$ between a second line segment $L_{2A}$ connecting the inward end 33A of the leading edge 31A in the radial direction of the rotor 1A and the tip 32A of the leading edge protrusion and a fifth line segment $L_{5A}$ connecting the outward end 35A of the leading edge 31A in the radial direction of the rotor 1A and the tip 32A of the leading edge protrusion is preferably 145° to 155° and more preferably 147° to 153°.

In the example in FIG. 2, in the projection plane perpendicular to the central axis of rotation O of the rotor 1A, a majority of a section 34A of the leading edge 31A of the blade 20A extending from the inward end 33A of the leading edge 31A in the radial direction of the rotor 1A to the tip 32A of the leading edge protrusion (also referred to as the "section of the leading edge 31A inward in the radial direction of the rotor 1A") is curved to be convex backward in the rotational direction RD of the rotor 1A with respect to the second line segment $L_{2A}$ connecting the inward end 33A of the leading edge 31A in the radial direction of the rotor 1A and the tip 32A of the leading edge protrusion. It suffices, however, for at least a portion of the section 34A of the leading edge 31A inward in the radial direction of the rotor 1A to be curved or bent backward in the rotational direction RD of the rotor 1A with respect to the second line segment $L_{2A}$. The section 34A may also be similarly curved or bent across the entire length thereof.

According to this structure of the section 34A of the leading edge 31A inward in the radial direction of the rotor 1A, as compared to when the section 34A extends along the second line segment $L_{2A}$, a vortex can be generated to flow even better along the section 34A due to the flow of wind near the section 34A and to centrifugal force when the rotor 1A rotates. As a result, the air resistance experienced by the blade 20A can be reduced.

In the example in FIG. 2, the trailing edge 41A of the blade 20A also has the same structure as the above-described leading edge 31A. In other words, in the projection plane perpendicular to the central axis of rotation O of the rotor 1A, at least a portion (the entirety in the illustrated example) of the trailing edge 41A of the blade 20A protrudes forward in the rotational direction RD of the rotor 1A with respect to a third line segment $L_{3A}$ connecting an inward end 43A of the trailing edge 41A in the radial direction of the rotor 1A and an outward end 45A of the trailing edge 41A in the radial direction of the rotor 1A. Furthermore, the tip 42A of the trailing edge protrusion, with respect to the third line segment $L_{3A}$, in the trailing edge 41A is positioned outward in the radial direction of the rotor 1A from the peripheral edge of the hub 10A by a distance of 0.4 to 0.6 times, preferably 0.47 to 0.57 times, and more preferably 0.51 to 0.53 times the length $BL_A$ of the blade 20A.

As illustrated in FIG. 2, when at least a portion of the section 34A extending from the inward end 33A of the leading edge 31A of the blade 20A in the radial direction of the rotor 1A to the tip 32A of the leading edge protrusion is curved or bent to be convex backward in the rotational direction of the rotor 1A with respect to the second line segment $L_{2A}$, then at least a portion (the entirety in the illustrated example) of a section 44A extending from the inward end 43A of the trailing edge 41A in the radial direction of the rotor 1A to the tip 42A of the trailing edge protrusion is preferably curved or bent to be convex backward in the rotational direction RD of the rotor 1A with respect to a fourth line segment $L_{4A}$ connecting the inward end 43A of the trailing edge 41A in the radial direction of the rotor 1A and the tip 42A of the trailing edge protrusion. According to this structure of the trailing edge 41A of the blade 20A, the trailing edge 41A can be formed to follow the shape of the leading edge 31A. Hence, in the projection plane perpendicular to the central axis of rotation O of the rotor 1A, the width of the blade 20A can be prevented from becoming excessively large in at least a portion at the width center line (the alternate long and short dash line in FIG. 1) of the blade 20A. The friction drag on the surface of the blade 20A can thus be prevented from becoming excessively large in at least a portion at the width center line of the blade 20A.

Like the leading edge 31A, from the perspective of reducing air resistance, the angle $\theta_{2A}$ between the fourth line segment $L_{4A}$ connecting the inward end 43A of the trailing edge 41A in the radial direction of the rotor 1A and the tip 42A of the trailing edge protrusion and a sixth line segment $L_{6A}$ connecting the outward end 45A of the trailing edge 41A in the radial direction of the rotor 1A and the tip 42A of the trailing edge protrusion is preferably 145° to 155° and more preferably 147° to 153°.

As illustrated in FIG. 2, in a projection plane perpendicular to the central axis of rotation O of the rotor 1A, when at least a portion of the section 34A extending from the inward end 33A of the leading edge 31A of the blade 20A in the radial direction of the rotor 1A to the tip 32A of the leading edge protrusion is curved or bent to be convex backward in the rotational direction of the rotor 1A with respect to the second line segment $L_{2A}$, then at least a portion (the entirety in the illustrated example) of a section 37A extending from the tip 32A of the leading edge protrusion to the outward end 35A in the radial direction of the rotor 1A is preferably curved or bent to be convex forward in the rotational direction RD of the rotor 1A with respect to the fifth line segment $L_{5A}$ connecting the tip 32A of the leading edge protrusion and the outward end 35A of the leading edge 31A in the radial direction of the rotor 1A. According to this structure, a vortex can be generated to flow even better along the section 37A due to the flow of wind near the section 37A and to centrifugal force when the rotor 1A rotates. As a result, the air resistance can be reduced further.

When at least a portion (the entirety in the illustrated example) of the section 37A extending from the tip 32A of the leading edge protrusion of the blade 20A to the outward end 35A in the radial direction of the rotor 1A is curved or bent to be convex forward in the rotational direction RD of the rotor 1A with respect to the fifth line segment $L_{5A}$, then from the perspective of reducing air resistance, at least a portion (the entirety in the illustrated example) of a section 47A extending from the tip 42A of the trailing edge protrusion to the outward end 45A of the trailing edge 41A in the radial direction of the rotor 1A is preferably curved or bent to be convex forward in the rotational direction RD of the rotor 1A with respect to the sixth line segment $L_{6A}$, connecting the tip 42A of the trailing edge protrusion and the outward end 45A of the trailing edge 41A in the radial direction of the rotor 1A.

In the example in FIG. 2, in a projection plane perpendicular to the central axis of rotation O of the rotor 1A, a tip portion of the blade 20A outward in the radial direction of the rotor 1A branches into a plurality of branched portions 51A. Each of the branched portions 51A tapers off outward in the radial direction of the rotor 1A.

Furthermore, in the example in FIG. 2, along the branched portions 51A, portions 36A, 46A of the leading edge 31A and the trailing edge 41A of the blade 20A along the branched portions 51A extend along respective tangent lines $l_1$, $l_2$ to the leading edge 31A and the trailing edge 41A at branch starting positions R, S of the branched portions 51A.

The branch starting position R of the branched portion 51A on the leading edge 31A refers to the intersection between the leading edge 31A and a perpendicular to the leading edge 31A from a back end P, in the rotational direction RD of the rotor 1A, of the branched portion 51A positioned furthest forward, among the branched portions 51A, in the rotational direction RD of the rotor 1A. The portion 36A of the leading edge along the branched portion 51A refers to the portion extending linearly from the branch starting position R of the leading edge 31A to the outward end 35A in the radial direction of the rotor 1A.

Similarly, the branch starting position Q of the branched portion 51A on the trailing edge 41A refers to the intersection between the trailing edge 41A and a perpendicular to the trailing edge 41A from a front end Q, in the rotational direction RD of the rotor 1A, of the branched portion 51A positioned furthest backward, among the branched portions 51A, in the rotational direction RD of the rotor 1A. The portion 46A of the trailing edge along the branched portion 51A refers to the portion extending linearly from the branch starting position S of the trailing edge 41A to the outward end 45A in the radial direction of the rotor 1A.

According to this structure of the tip portion of the blade 20A outward in the radial direction, when the rotor 1A rotates, the vortex generated near the tip portion of the blade 20A can be weakened. As a result, the air resistance can be reduced further.

In the example in FIG. 2, in the projection plane perpendicular to the central axis of rotation O of the rotor 1A, the shape, direction of extension, and length of extension of each of the branched portions 51A are nearly identical, yet the branched portions 51A may have a different direction of extension and/or length of extension.

The direction of extension and length of extension of a branched portion 51A refer to the direction of extension and length of extension of a line segment that connects the outward end of the branched portion 51A in the radial direction of the rotor 1A and intermediate points between the front end and the back end of the branched portion 51A in the rotational direction RD of the rotor 1A. The direction of extension and length of extension of the branched portions 51A that are furthest to the front and the back in the rotational direction RD of the rotor 1A, however, refer to the direction of extension and length of extension of the portions 36A, 46A, along the branched portions 51A, of the leading edge 31A and the trailing edge 41A.

In the projection plane, the shape of each branched portion 51A is approximately triangular in FIG. 2, yet as long as the branched portions 51A taper off outward in the radial direction of the rotor 1A, they may be of any shape, such as an approximate Gaussian curve or approximately trapezoidal. In the projection plane, the branched portions 51A are not limited to being connected to each other as in the example in FIG. 2. While not illustrated, the branched portions 51A may be separated from each other.

It is preferable, from the perspective of reducing air resistance, for the directions of extension of the branched portions 51A to change gradually and smoothly from one branched portion 51A to the next between the forward-end branched portion 51A and the backward-end branched portion 51A in the rotational direction RD of the rotor 1A.

In the example in FIG. 2, the directions of extension of the branched portions 51A are approximately parallel to each other. Instead of the structure in the example in FIG. 2, however, with increasing distance outward in the radial direction of the rotor 1A, the directions of extension of the branched portions 51A from the branched portion 51A furthest forward to the branched portion 51A furthest back in the rotational direction RD of the rotor 1A more preferably extend in directions that separate from each other and change gradually and smoothly from one branched portion 51A to the next. With this structure, when the rotor 1A rotates, the vortex that is generated near the tip portion of the blade 20A can be caused to flow more smoothly outward in the radial direction of the rotor 1A and backward in the rotational direction RD. Air resistance can thus be further reduced.

In the projection plane perpendicular to the central axis of rotation O of the rotor 1A, the outward end 35A of the leading edge 31A in the radial direction of the rotor 1A and the outward end 45A of the trailing edge 41A in the radial direction of the rotor 1A need not lie on the same circle having the central axis of rotation O of the rotor 1A as the center.

FIG. 3 is a cross-section along the A-A line in the width direction of the blade 20A in FIG. 2. While not illustrated in FIGS. 1 and 2, a plurality of projections 50 is formed on the surface of the blade 20A, as illustrated in FIG. 3, thereby providing the surface of the blade 20A with unevenness approximately like that of rough skin. In this context, the surface of the blade 20A refers to both the surface of the blade 20A at the front side of the rotor 1A (i.e. the front of FIG. 1) and the surface of the blade 20A at the back side of the rotor 1A (i.e. the back of FIG. 1).

The height h and diameter d of the projection 50 illustrated in the partial enlargement in FIG. 3 are preferably each 5 mm or less and more preferably 3 mm or less. Considering the cost of surface treatment for the blade 20A, the height h and diameter d of each projection 50 are preferably at least 0.001 mm and more preferably at least 0.01 mm.

In the example in FIG. 3, the projections 50 are formed over nearly the entire surface of the blade 20A. The number of projections 50 per unit area on the surface of the blade 20A at the front side of the rotor 1A decreases from the leading edge 31A towards the trailing edge 41A of the blade 20A. Specifically, in the example in FIG. 3, the number of projections 50 per unit area on the surface of the blade 20A at the front side of the rotor 1A decreases from the leading edge 31A towards the trailing edge 41A of the blade 20A with one location (the position of the alternate long and two short dashes line in FIG. 3) as a border. Therefore, on the surface of the blade 20A at the front side of the rotor 1A, the number of projections 50 per unit area in a region on the leading edge 31A side is greater than the number of projections 50 per unit area in a region on the trailing edge 41A side.

While not illustrated, the number of projections 50 per unit area on the surface of the blade 20A at the front side of the rotor 1A may decrease from the leading edge 31A towards the trailing edge 41A of the blade 20A with a plurality of locations as borders or may decrease gradually.

Furthermore, in the example in FIG. 3, the number of projections 50 per unit area on the surface of the blade 20A at the back side of the rotor 1A is approximately constant from the leading edge 31A to the trailing edge 41A of the blade 20A and is equivalent to the number in the region at the trailing edge 41A side on the surface at the front side of the rotor 1A. Like the surface of the blade 20A at the front side of the rotor 1A, however, the number of projections 50 per unit area on the surface at the back side of the rotor 1A as well may decrease from the leading edge 31A towards the trailing edge 41A of the blade 20A.

According to this structure for the surface of the blade 20A, while weakening the turbulent flow occurring mainly near the region on the leading edge 31A side of the surface of the blade 20A at the front side of the rotor 1A, if the turbulent flow also occurs near or advances to another surface region of the blade 20A, such turbulent flow can also be weakened. This structure is particularly advantageous when, depending on the dimensions, the three-dimensional shape, or the like of the blade 20A, the turbulent flow not only occurs near the region on the leading edge 31A side of the surface of the blade 20A at the front side of the rotor 1A but also occurs near or advances to another surface region of the blade 20A.

Forming the projections 50 at least on a region at the leading edge 31A side of the surface of the blade 20A at the front side of the rotor 1A yields the effect of weakening the turbulent flow occurring mainly at least near the region on the leading edge 31A side of the surface of the blade 20A at the front side of the rotor 1A. Therefore, while not illustrated, the projections 50 may alternatively be formed in only the region on the leading edge 31A side of the surface of the blade 20A at the front side of the rotor 1A.

The dimensions and shape of each projection 50 may differ. For example, in a cross-section perpendicular to the surface of the blade 20A (i.e. in the plane in FIG. 3), the cross-sectional shape of each projection 50 is an approximate Gaussian curve in the example in FIG. 3, yet any shape may be adopted, such as a shape that is approximately a half arc or approximately rectangular, and the shapes may be identical or different. Similarly, in the projection plane perpendicular to the central axis of rotation O of the rotor 1A (i.e. in the plane of FIG. 2), the projection shape of each projection 50 is approximately circular in the example in FIG. 3, yet any shape may be adopted, such as a shape that is approximately elliptical, approximately rectangular, approximately triangular, or the like, and the shapes may be identical or different.

In a cross-section along the width direction of the blade 20A, as illustrated in FIG. 3, the distribution of the projections 50 on the surface of the blade 20A may be approximately the same as or different from a similar cross-section of the blade 20A at each point along the width center line of the blade 20A (the alternate long and short dash line in FIG. 1).

The above-described structure related to the distribution of the projections 50 on the surface of the blade 20A is not limited to the case of the structure in a cross-section along the width direction of the blade 20A at each point along the width center line of the blade 20A and also includes the case of the structure when averaging the distribution of projections 50 in the cross-section at each point along the width center line of the blade 20A.

According to Embodiment 1, when using the rotor 1A in a wind power generator, the air resistance when the rotor 1A rotates can be reduced in usage conditions such that laminar flow occurs, thus reducing noise and improving power generation efficiency. Similarly, when using this rotor 1A in a water power generator, the water resistance when the rotor 1A rotates can be reduced, thus improving power generation efficiency.

Embodiment 1 of Another Rotor According to the Present Invention

Figure 4:
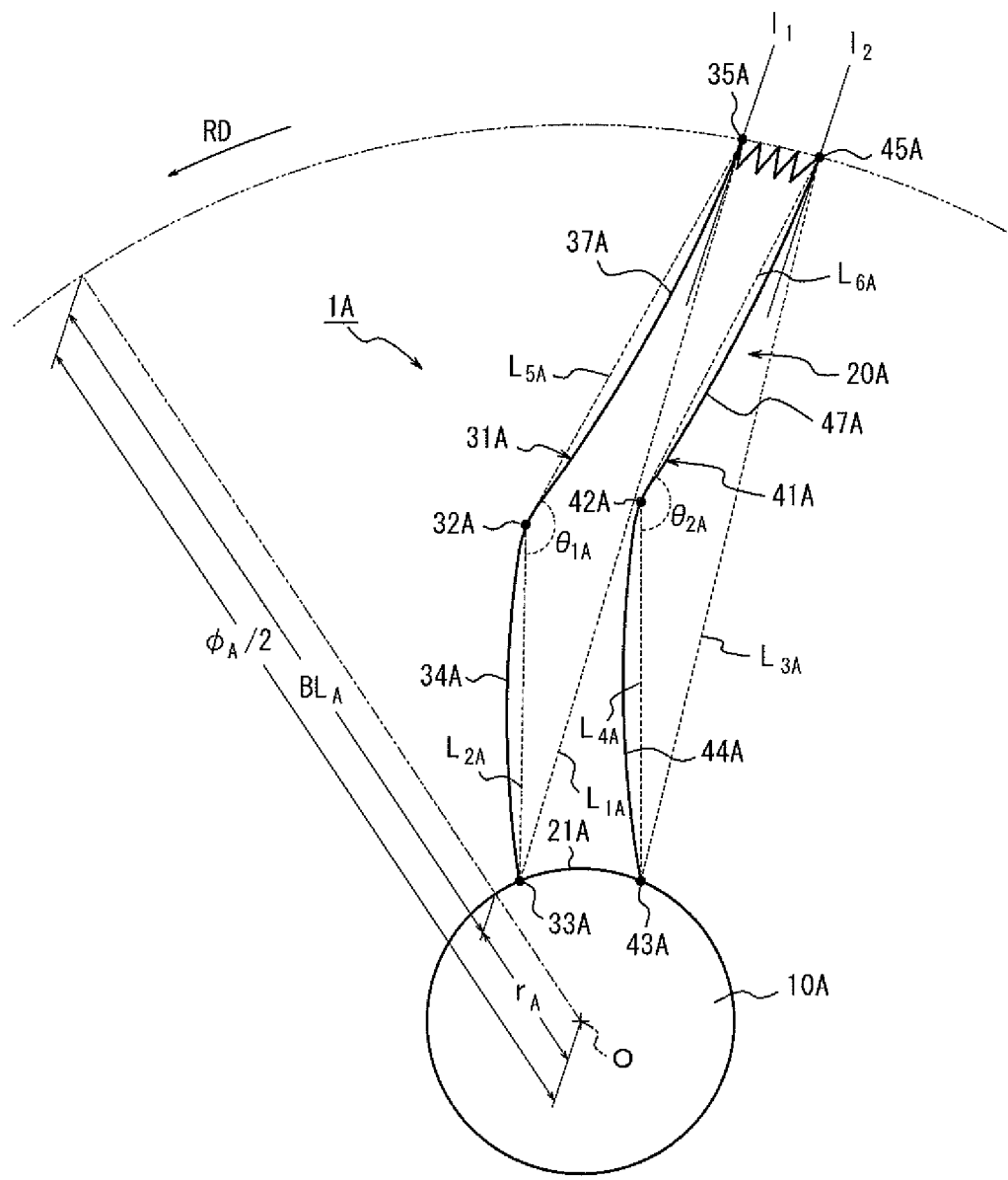
FIG. 4 is a front view illustrating Embodiment 1 of another rotor according to the present invention.

Next, Embodiment 1 of another rotor according to the present invention is described with reference to FIG. 4. Note that a description of the structure and effects of portions that are the same as in the embodiment described with reference to FIGS. 1 to 3 are omitted. Rather, the description of the present embodiment focuses on the differences. In the Embodiment illustrated in FIG. 4, in the projection plane perpendicular to the central axis of rotation O of the rotor 1A, at least a portion (the entirety in the illustrated example) of the section 34A of the leading edge 31A of the blade 20A extending from the inward end 33A of the leading edge 31A in the radial direction of the rotor 1A to the tip 32A of the leading edge protrusion is curved or bent (curved in the illustrated example) to be convex forward in the rotational direction RD of the rotor 1A with respect to the second line segment $L_{2A}$ connecting the inward end 33A of the leading edge 31A in the radial direction of the rotor 1A and the tip 32A of the leading edge protrusion.

According to this structure for the section 34A of the leading edge 31A inward in the radial direction of the rotor 1A, the air resistance experienced by the blade 20A can be reduced as compared to when the section 34A extends along the second line segment $L_{2A}$.

Furthermore, in the present embodiment, at least a portion (the entirety in the illustrated example) of the section 37A extending from the tip 32A of the leading edge protrusion to the outward end 35A of the leading edge 31A of the blade 20A in the radial direction of the rotor 1A is curved or bent (curved in the illustrated example) to be convex backward in the rotational direction RD of the rotor 1A with respect to the fifth line segment $L_{5A}$ connecting the tip 32A of the leading edge protrusion and the outward end 35A of the leading edge 31A in the radial direction of the rotor 1A.

This structure can further reduce the air resistance as compared to when the section 37A extends along the fifth line segment $L_{5A}$.

In the present embodiment, in the projection plane perpendicular to the central axis of rotation O of the rotor 1A, the tip 32A of the leading edge protrusion, with respect to the first line segment $L_{1A}$, in the leading edge 31A of the blade 20A may be positioned outward in the radial direction of the rotor 1A from the peripheral edge of the hub 10A by any distance. From the perspective of reducing air resistance, however, the tip 32A of the leading edge protrusion with respect to the first line segment $L_{1A}$ is preferably positioned outward in the radial direction of the rotor 1A from the peripheral edge of the hub 10A by a distance of 0.35 to 0.65 times the length $B_{LA}$ of the blade 20A.

When, as in the present embodiment, at least a portion of the section 34A extending from the inward end 33A of the leading edge 31A of the blade 20A in the radial direction of the rotor 1A to the tip 32A of the leading edge protrusion is curved or bent to be convex forward in the rotational direction of the rotor 1A with respect to the second line segment $L_{2A}$, then from the perspective of reducing air resistance, at least a portion (the entirety in the illustrated example) of the section 44A extending from the inward end 43A of the trailing edge 41A in the radial direction of the rotor 1A to the tip 42A of the trailing edge protrusion is preferably curved or bent to be convex forward in the rotational direction RD of the rotor 1A with respect to the fourth line segment $L_{4A}$.

Similarly, when as in the present embodiment at least a portion (the entirety in the illustrated example) of the section 37A extending from the tip 32A of the leading edge protrusion to the outward end 35A of the leading edge 31A of the blade 20A in the radial direction of the rotor 1A is curved or bent to be convex backward in the rotational direction RD of the rotor 1A with respect to the fifth line segment $L_{5A}$, then from the perspective of reducing air resistance, at least a portion (the entirety in the illustrated example) of the section 47A extending from the tip 42A of the trailing edge protrusion to the outward end 45A of the trailing edge 41A in the radial direction of the rotor 1A is preferably curved or bent to be convex backward in the rotational direction RD of the rotor 1A with respect to the sixth line segment $L_{6A}$ connecting the tip 42A of the trailing edge protrusion and the outward end 45A of the trailing edge 41A in the radial direction of the rotor 1A.

Embodiment 2 of Rotor According to the Present Invention

In general, when the diameter of the rotor exceeds 5 m, in addition to a vortex, a turbulent flow occurs near the leading edge of the blade when the rotor rotates. This turbulent flow might cause the lift to decrease and the fluid resistance to increase. Furthermore, when the diameter of the rotor exceeds 5 m, then as compared to when the diameter of the rotor is 5 m or less, the moving velocity of the tip portion of the blade outward in the radial direction of the rotor tends to increase. Therefore, if the tip portion of the blade has a plurality of branched portions as in the above-described Embodiment 1, the vortex near the tip portion might increase. Embodiment 2 resolves such a problem.

Figure 5:
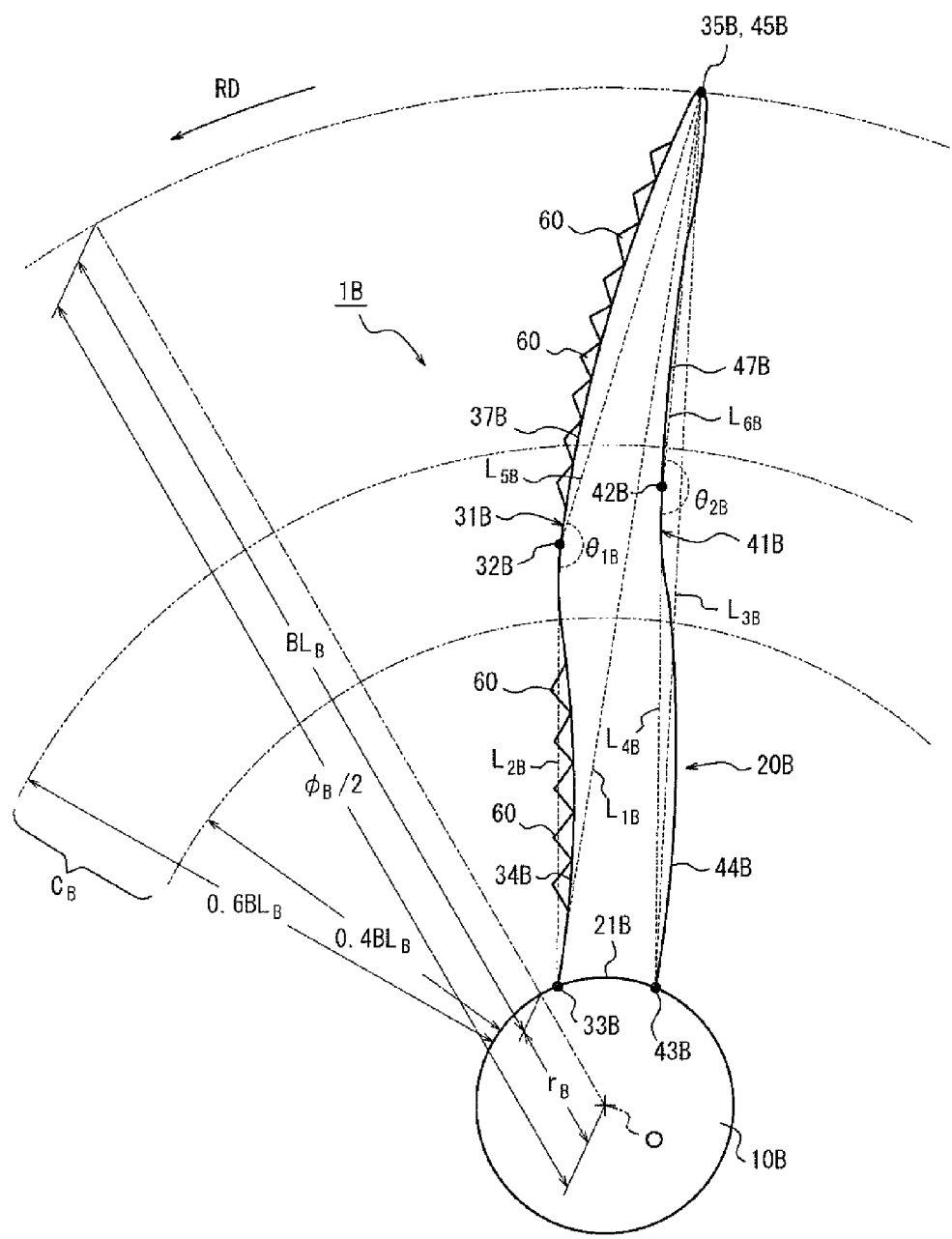
FIG. 5 is a front view illustrating the main parts of a rotor according to Embodiment 2 of the present invention.

Embodiment 2 of the present invention is described with reference to FIG. 5. FIG. 5 is a front view of the main parts of a rotor 1B, according to Embodiment 2 of the present invention, for a wind or water power generator. Note that a description of the structure and effects of portions that are the same as in the embodiment described with reference to FIGS. 1 to 3 are omitted. Rather, the description of the present embodiment focuses on the differences. The rotor 1B in FIG. 5 is used in a wind power generator. The diameter $\varphi_B$ of the rotor 1B is 10 m, the number of revolutions at a wind speed of 5 m/s to 20 m/s is 10 rpm to 50 rpm, and the output is 15 kW. It is assumed that the rotor 1B is used in a turbulent flow region with a Reynolds number exceeding 100,000 (including a transitional region between a laminar flow and a turbulent flow). The rotor 1B according to the present embodiment, however, can be used not only in a wind power generator but also in a water power generator or another wind or water power machine. The diameter $\varphi_B$ of the rotor 1B preferably exceeds 5 m. From the perspective of mechanical strength, the diameter $\varphi_B$ is also preferably 250 m or less and more preferably 200 m or less.

In Embodiment 2 illustrated in FIG. 5, unlike Embodiment 1, a plurality of extended portions 60 is provided along the leading edge 31B in a projection plane perpendicular to the central axis of rotation O of the rotor 1B (i.e. in the plane of FIG. 5). Each of the extended portions 60 extends forward in the rotational direction RD of the rotor 1B from a leading edge 31B of a blade 20B and tapers off forward in the rotational direction RD of the rotor 1B. As illustrated, in the projection plane, the edge at the base of each extended portion 60 (backward in the rotational direction of the rotor 1B) is adjacent to the leading edge 31B, i.e. forms a portion of the outline of the leading edge 31B.

These extended portions 60 provided on the leading edge 31B of the blade 20B can suppress the occurrence of turbulent flow near the leading edge 31B of the blade 20B. As a result, the lift of the rotor 1B can be increased, and the air resistance can be reduced.

In the projection plane perpendicular to the central axis of rotation O of the rotor 1B (i.e. in the plane of FIG. 5), the shape, direction of extension, and length of extension may differ between extended portions 60.

The direction of extension and length of extension of an extended portion 60 refer to the direction of extension and length of extension of a line segment that connects the forward tip of the extended portion 60 in the rotational direction RD of the rotor 1B and intermediate points between the inward end and the outward end of the extended portion 60 in the radial direction of the rotor 1B.

In the projection plane, the shape of each extended portion 60 is approximately triangular in FIG. 5, yet as long as the extended portions 60 taper off forward in the rotational direction RD of the rotor 1B, they may be of any shape, such as an approximate Gaussian curve or approximately trapezoidal. In the projection plane, the extended portions 60 are not limited to being connected to each other as in the example in FIG. 5. While not illustrated, the extended portions 60 may be separated from each other. As illustrated in FIG. 5, not providing the extended portions 60 near a tip 32B of the leading edge protrusion or near an inward end 33B and an outward end 35B of the leading edge 31B in the radial direction of the rotor 1B is preferable from the perspective of reducing air resistance.

Next, the blade 20B in Embodiment 2 in FIG. 5 differs from Embodiment 1 in that the tip portion of the blade 20B outward in the radial direction of the rotor 1B tapers off outward in the radial direction of the rotor 1B.

According to this structure of the tip portion of the blade 20B outward in the radial direction of the rotor 1B, as compared to a structure that includes a plurality of branched portions as in Embodiment 1, the occurrence of a vortex near the tip portion of the blade 20B can be suppressed.

From the perspective of weakening the vortex that occurs near the leading edge 31B, unlike Embodiment 1, the angle $\theta_{1B}$ between a second line segment $L_{2B}$ connecting the inward end 33B of the leading edge 31B in the radial direction of the rotor 1B and the tip 32B of the leading edge protrusion and a fifth line segment $L_{5B}$ connecting the outward end 35B of the leading edge 31B in the radial direction of the rotor 1B and the tip 32B of the leading edge protrusion is preferably 160° to 175°.

When adopting the same structure as the leading edge 31B for the trailing edge 41B, from the perspective of reducing the air resistance, the angle $\theta_{2B}$ between a fourth line segment $L_{4B}$ connecting an inward end 43B of the trailing edge 41B in the radial direction of the rotor 1B and a tip 42B of the trailing edge protrusion and a sixth line segment $L_{6B}$ connecting an outward end 45B of the trailing edge 41B in the radial direction of the rotor 1B and the tip 42B of the trailing edge protrusion is preferably 160° to 175°.

While not illustrated, from the perspective of weakening the turbulent flow generated near the surface of the blade 20B, as in Embodiment 1, a plurality of the projections 50 described with reference to FIG. 3 is formed on the surface of the blade 20B, thereby providing the surface of the blade 20B with unevenness approximately like that of rough skin. Details on the projections 50 are the same as in Embodiment 1 and hence are omitted here.

From the perspective of reducing air resistance, the projections 50 are preferably not provided on the surface of the above-described extended portions 60.

According to Embodiment 2, when using the rotor 1B in a wind power generator, the air resistance when the rotor 1B rotates can be reduced in usage conditions such that turbulent flow mainly occurs, thus reducing noise and improving power generation efficiency. Similarly, when using this rotor 1B in a water power generator, the water resistance when the rotor 1B rotates can be reduced, thus improving power generation efficiency.

Embodiment 2 of Another Rotor According to the Present Invention

Figure 6:
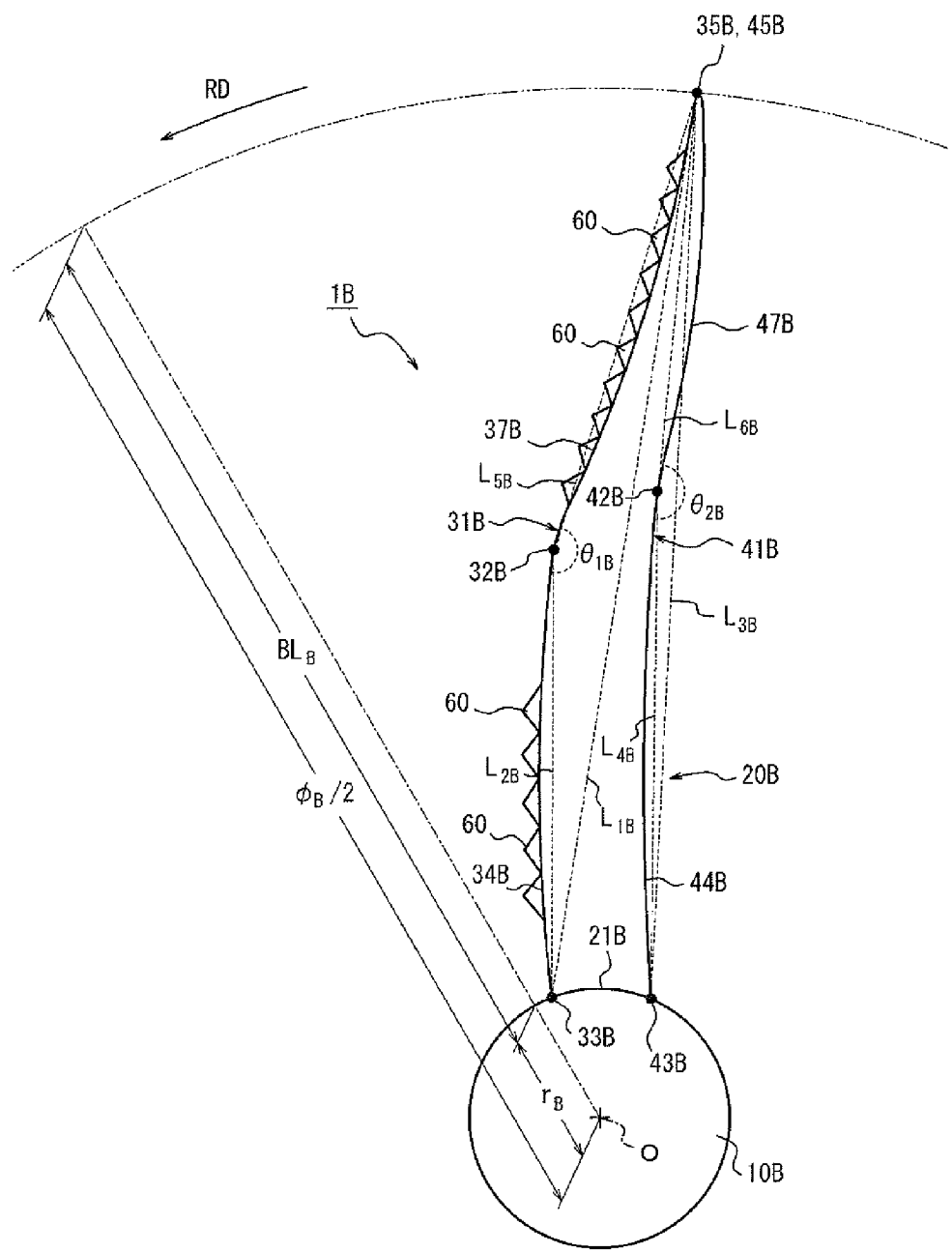
FIG. 6 is a front view illustrating Embodiment 2 of another rotor according to the present invention.

As illustrated in FIG. 6, the structure of the leading edge 31A and trailing edge 41A in the embodiment described with reference to FIG. 4 may be adopted in the rotor 1B of the embodiment described with reference to FIG. 5.

EXAMPLES

Next, the performance of a rotor according to the present invention and of another rotor according to the present invention were assessed by analysis, as described below. Comparative Example Rotors 1 to 3 and Example Rotors 1 to 8 each had a blade length $BL_A$ of 0.50 m, a hub radius $r_A$ of 0.10 m, and a rotor diameter $\varphi_A$ of 1.20 m. The analysis conditions for the rotors were as follows: wind speed of 5 m/s, aspect ratio of the blade of 6.67, frequency of 1.59 Hz, tip speed ratio of 1.20, Reynolds number of 25,000, and pitch angle of the blade of 35°.

In a projection plane perpendicular to the central axis of rotation of the rotor, the aspect ratio of the blade is the ratio of the square of the blade length to the blade area.

The frequency is the number of revolutions of the blade per second.

The tip speed ratio is the ratio of the speed of the outward end of the blade in the radial direction of the rotor to the wind speed.

The pitch angle of the blade is the angle between a plane perpendicular to the central axis of rotation of the rotor and a plane passing through the leading edge and the trailing edge of the blade.

The other particular analysis conditions for each rotor are listed in Tables 1 and 2.

Comparative Example Rotor 1

In a projection plane perpendicular to the central axis of rotation O of the rotor 1A, the leading edge and trailing edge of the blade in Comparative Example Rotor 1 each extend linearly, i.e. along a first line segment and a third line segment connecting the inward ends in the radial direction of the rotor to the outward ends in the radial direction of the rotor.

Comparative Example Rotors 2 and 3, Example Rotors 1 to 3

In the above projection plane, the leading edge and trailing edge of the blade in each of the Comparative Example Rotors 2 and 3 and Example Rotors 1 to 3 each protrude forward in the rotational direction of the rotor with respect to the first line segment and the third line segment. Furthermore, in the projection plane, the leading edge of the blade in each of the Comparative Example Rotors 2 and 3 and Example Rotors 1 to 3 has the concavo-convex shape illustrated in FIG. 2. In other words, the leading edge is curved to be convex backward in the rotational direction of the rotor with respect to a second line segment connecting the inward end of the leading edge in the radial direction of the rotor and the tip of the leading edge protrusion, and the leading edge is curved to be convex forward in the rotational direction of the rotor with respect to a fifth line segment connecting the tip of the leading edge protrusion and the outward end of the leading edge in the radial direction of the rotor. In the projection plane, the trailing edge of the blade in each of the Comparative Example Rotors 2 and 3 and Example Rotors 1 to 3 extends along a fourth line segment connecting the inward end of the trailing edge in the radial direction of the rotor and the tip of the trailing edge protrusion, and the trailing edge also extends along a sixth line segment connecting the tip of the trailing edge protrusion and the outward end of the trailing edge in the radial direction of the rotor.

Example Rotors 4 to 8

In the projection plane, the leading edge and trailing edge of the blade in each of the Example Rotors 4 to 8 each protrude forward in the rotational direction of the rotor with respect to the first line segment and the third line segment. Furthermore, in the projection plane, the leading edge of the blade in each of Example Rotors 4 to 8 has the convexo-concave shape illustrated in FIG. 4. In other words, the leading edge is curved to be convex forward in the rotational direction of the rotor with respect to the second line segment and curved to be convex backward in the rotational direction of the rotor with respect to the fifth line segment. In the projection plane, the trailing edge of the blade in each of Example Rotors 4 to 8 extends along the fourth line segment and along the sixth line segment.

In Tables 1 and 2, "$\theta_{LA}$" represents the angle between the second line segment and the fifth line segment. In the projection plane, "$\alpha$" represents the angle between a line traversing the central axis of rotation of the rotor and the inward end of the leading edge in the radial direction of the rotor and a line traversing the central axis of rotation of the rotor and the outward end of the leading edge in the radial direction of the rotor. The "position of the tip of the leading edge protrusion" indicates the distance, along the radial direction of the rotor, from the peripheral surface of the hub to the tip of the leading edge protrusion of the blade. The distance is expressed as a multiple of the blade length $BL_A$. The "drag torque" is the time average of the aerodynamic drag torque. A smaller value indicates smaller air resistance experienced by the blade and better rotor efficiency. The "rate of increase in drag torque" indicates the ratio of i) the value yielded by subtracting the drag torque of Comparative Example Rotor 1 from the drag torque of each rotor to ii) the drag torque of Comparative Example Rotor 1. A smaller rate of increase (a larger negative value) indicates less air resistance experienced by the blade and better rotor efficiency.

TABLE 1

|  | Comparative Example Rotor 1 | Comparative Example Rotor 2 | Example Rotor 1 | Example Rotor 2 | Example Rotor 3 | Comparative Example Rotor 3 |
|---|---|---|---|---|---|---|
| $\theta_{LA}$ [°] | — | 150 | 150 | 150 | 150 | 150 |
| $\alpha$ [°] | 17.1 | 20.9 | 19.6 | 17.1 | 14.3 | 13.1 |
| Position of the tip of the leading edge protrusion | — | 0.35 $BL_A$ | 0.40 $BL_A$ | 0.50 $BL_A$ | 0.60 $BL_A$ | 0.65 $BL_A$ |
| Shape of leading edge | linear | concavo-convex | concavo-convex | concavo-convex | concavo-convex | concavo-convex |
| Drag torque [N · m] | 0.0976 | 0.1057 | 0.0882 | 0.0847 | 0.0927 | 0.1120 |
| Rate of increase in drag torque [%] | 0 | 8.3 | −9.6 | −13.3 | −5.0 | 14.7 |

TABLE 2

| | Comparative Example Rotor 1 | Example Rotor 4 | Example Rotor 5 | Example Rotor 6 | Example Rotor 7 | Example Rotor 8 |
|---|---|---|---|---|---|---|
| $\theta_{1A}$ [°] | — | 150 | 150 | 150 | 150 | 150 |
| $\alpha$ [°] | 17.1 | 20.9 | 19.6 | 17.1 | 14.3 | 13.1 |
| Position of the tip of the leading edge protrusion | — | 0.35 $BL_A$ | 0.40 $BL_A$ | 0.50 $BL_A$ | 0.60 $BL_A$ | 0.65 $BL_A$ |
| Shape of leading edge | linear | convexo-concave | convexo-concave | convexo-concave | convexo-concave | convexo-concave |
| Drag torque [N · m] | 0.0976 | 0.0720 | 0.0762 | 0.0765 | 0.0777 | 0.0786 |
| Rate of increase in drag torque [%] | 0 | −26.3 | −21.9 | −21.6 | −20.4 | −19.5 |

As is clear from Table 1, in Example Rotors 1 to 3 for which the tip of the leading edge protrusion is at 0.40 $BL_A$ to 0.60 $BL_A$, the drag torque is smaller than for each of Comparative Example Rotors 1 to 3. Hence, the air resistance experienced by the blade is reduced, and the rotor efficiency is increased.

As is clear from Table 2, regardless of the position of the tip of the leading edge protrusion, in Example Rotors 4 to 8 in which the leading edge has a convexo-concave shape, the drag torque is smaller than for Comparative Example Rotor 1. Hence, the air resistance experienced by the blade is reduced, and the rotor efficiency is increased.

Therefore, it is clear that according to the rotor of the present invention, the air resistance experienced by the blade can be reduced, and the efficiency can be improved.

INDUSTRIAL APPLICABILITY

A rotor according to the present invention can be used in a wind or water power machine that uses a fluid force, e.g. wind power, water power, or the like, as the source of motive power, such as a wind power generator or water power generator that use a horizontal shaft rotor or the like.

REFERENCE SIGNS LIST 1A, 1B: Rotor
10A, 10B: Hub
20A, 20B: Blade
21A, 21B: Root end of blade
31A, 31B: Leading edge
32A, 32B: Tip of leading edge protrusion
33A, 33B: Inward end of leading edge in radial direction of rotor
34A, 34B: Section of leading edge extending from inward end of leading edge in radial direction of rotor to tip of leading edge protrusion
35A, 35B: Outward end of leading edge in radial direction of rotor
36A: Portion of leading edge of blade along branched portion
37A, 37B: Section of leading edge extending from tip of leading edge protrusion to outward end of leading edge in radial direction of rotor
41A, 41B: Trailing edge
42A, 42B: Tip of trailing edge protrusion
43A, 43B: Inward end of trailing edge in radial direction of rotor
44A, 44B: Section of trailing edge extending from inward end of trailing edge in radial direction of rotor to tip of trailing edge protrusion
45A, 45B: Outward end of trailing edge in radial direction of rotor
46A: Portion of trailing edge of blade along branched portion
47A, 47B: Section of trailing edge extending from tip of trailing edge protrusion to outward end of trailing edge in radial direction of rotor
50: Projection
51A: Branched portion
60: Extended portion
$BL_A$, $BL_B$: Blade length
$L_{1A}$, $L_{1B}$: First line segment
$L_{2A}$, $L_{2B}$: Second line segment
$L_{3A}$, $L_{3B}$: Third line segment
$L_{4A}$, $L_{4B}$: Fourth line segment
$L_{5A}$, $L_{5B}$: Fifth line segment
$L_{6A}$, $L_{6B}$: Sixth line segment
O: Central axis of rotation of rotor
R, S: Branch starting position
RD: Rotational direction
d: Diameter of projection
h: Height of projection
$l_1$, $l_2$: Tangent line
$r_A$, $r_B$: Radius of hub
$\varphi_A$, $\varphi_B$: Diameter of rotor
$\theta_{1A}$, $\theta_{2A}$, $\theta_{1B}$, $\theta_{2B}$: Angle

The invention claimed is:

1. A rotor for a wind or water power machine, the rotor comprising a hub, supported by a main shaft, and a blade, a root end of the blade being connected to the hub, wherein
in a projection plane perpendicular to a central axis of rotation of the rotor,
an entirety of a leading edge of the blade protrudes forward in a rotational direction of the rotor with respect to a first line segment connecting an inward end of the leading edge in a radial direction of the rotor and an outward end of the leading edge in the radial direction of the rotor,
an entirety of a section of the leading edge of the blade extending from the inward end of the leading edge in the radial direction of the rotor to a tip of a leading edge protrusion is curved or bent to be convex forward in the rotational direction of the rotor with respect to a second line segment connecting the inward end of the leading edge in the radial direction of the rotor and the tip of the leading edge protrusion,
an entirety of a section of the leading edge of the blade extending from the tip of the leading edge protrusion to the outward end of the leading edge in the radial direction of the rotor protrudes backward in the rotational direction of the rotor with respect to a fifth line segment connecting the tip of the leading edge protrusion and the outward end of the leading edge in the radial direction of the rotor, and an entirety of a trailing edge of the blade protrudes forward in the rotational direction of the rotor with respect to a third line segment connecting an inward end of the trailing edge in the radial direction of the rotor and an outward end of the trailing edge in the radial direction of the rotor an entirety of the trailing edge of the blade extending from the inward end of the trailing edge in the radial direction of the rotor to a tip of a trailing edge protrusion is curved or bent to be convex forward in the rotational direction of the rotor with respect to a fourth line segment connecting the inward end of the trailing edge in the radial direction of the rotor and the tip of the trailing edge protrusion, and an entirety of the trailing edge of the blade extending from the tip of the trailing edge protrusion to the outward end of the trailing edge in the radial direction of the rotor is curved or bent to be convex backward in the rotational direction of the rotor with respect to a sixth line segment connecting the tip of the trailing edge protrusion and the outward end of the trailing edge in the radial direction of the rotor.

2. The rotor according to claim 1, wherein
in a projection plane perpendicular to a central axis of rotation of the rotor,
a tip portion of the blade outward in the radial direction of the rotor comprises a plurality of branched portions,
each of the branched portions tapers off outward in the radial direction of the rotor, and
a portion of the leading edge and a portion of a trailing edge of the blade along the branched portions extend along respective tangent lines to the leading edge and the trailing edge at branch starting positions of the branched portions.

3. The rotor according to claim 1, wherein
in a projection plane perpendicular to a central axis of rotation of the rotor,
a plurality of extended portions is provided along the leading edge, the extended portions extending forward in the rotational direction of the rotor from the leading edge of the blade and tapering off forward in the rotational direction of the rotor, and
a tip portion of the blade outward in the radial direction of the rotor tapers off outward in the radial direction of the rotor.

4. The rotor according to claim 1, wherein
a plurality of projections each having a height and diameter of 5 mm or less is formed in a region at least on a leading edge side of a surface of the blade at a front side of the rotor.

5. The rotor according to claim 4, wherein the number of the projections per unit area on the surface of the blade at least at the front side of the rotor decreases from the leading edge towards the trailing edge of the blade.

* * * * *